United States Patent [19]

Bosserman

[11] 4,362,938

[45] Dec. 7, 1982

[54] INFRARED VIEWING SYSTEM

[75] Inventor: David A. Bosserman, Alexandria, Va.

[73] Assignee: The United States of America as represented by the Secretary of the Army, Washington, D.C.

[21] Appl. No.: 206,913

[22] Filed: Nov. 14, 1980

[51] Int. Cl.[3] .............................................. H01J 31/50

[52] U.S. Cl. ..................................... 250/332; 250/334

[58] Field of Search ............... 250/332, 334, 347, 348, 250/349

[56] References Cited

U.S. PATENT DOCUMENTS

| | | | |
|---|---|---|---|
| 3,883,437 | 5/1975 | Nummedal et al. | 250/334 X |
| 3,902,066 | 8/1975 | Roosild et al. | 250/330 X |
| 3,949,225 | 4/1976 | Aguilera | 250/334 |
| 3,973,124 | 8/1976 | Astheimer | 250/334 |

*Primary Examiner*—Davis L. Willis

*Attorney, Agent, or Firm*—Nathan Edelberg; Milton W. Lee; Aubrey J. Dunn

[57] ABSTRACT

A column of infrared detectors are repetitively optically scanned across an infrared scene. The outputs of the detectors are fed to a viewing matrix of light emitters consisting of a plurality of columns of detectors, each column having light emitters corresponding to respective detectors. As the detectors are scanned across the scene, successive columns of detectors are energized or enabled such that the light emitted by the individual emitters is directly related to the infrared radiation falling on a corresponding detector. The image may thus be directly viewed by an observer. An alternate system employs a storage matrix having light detectors corresponding to the emitters of the viewing matrix such that the output of the viewing matrix, instead of being directly viewed, is stored and is then read out in a normal television raster to provide a video signal for distant television viewing.

2 Claims, 2 Drawing Figures

CLOCKED POWER SOURCE 18
SEQUENTIAL SWITCHER 17
MOTOR 13
12, 14, 15, 16, 16a, 16b, 10, 11, 19, 20

SEQUENTIAL SWITCHER
CLOCKED POWER SOURCE
MOTOR 10
11
12
13
14
15
16
16a
16b
17
18
19
20

INFRARED VIEWING SYSTEM

The invention described herein may be maufactured, used, and licensed by the U.S. Government for governmental purposes without the payment of any royalties thereon.

BACKGROUND OF THE INVENTION

1. Field of the Invention

This invention is in the field of infrared-to-visible image converters; in particular, those converters using a column of infrared detectors.

2. Description of the Prior Art

Various detector systems exist for producing visible images of infrared scenes. These systems include both thermal detectors and quantum detectors. In the cases of discrete detectors, small detectors (with respect to visible image size) may be used in some scanning arrangment. For example, a column of detectors may be used with a scanning mirror or the like to scan an infrared scene and to produce signals therefrom. In order to present an image to an observer, the signals from the detector column are fed to an LED column. The light from the LEDs is reflected from the rear of the scanning mirror through an eyepiece to the observer's eye. This scheme requires good alignment between the mirror and the eyepiece and has problems with image quality and distortion. The correction of these problems requires moving eyepiece compensating elements; these elements in turn have problems of synchronization with the mirror. In order to provide remote viewing, this exemplary system requires a television camera synchronized to the mirror scanning rate.

SUMMARY OF THE INVENTION

The invention is an infrared imaging system using a column of infrared detectors optically swept over an infrared scene. Outputs of the detectors are fed in parallel to a matrix of light emitters such as light emitting diodes (LEDs). This matrix consists of a plurality of columns of emitters with each column having an emitter corresponding to each detector of the column of detectors. As the column of detectors is swept over the infrared scene, the output of the detectors are sequentially connected to responsive elements in successive columns of light emitters in the matrix. The matrix may be directly viewed by an observer. Alternatively, (and an advantage over the prior art) the matrix may be imaged onto a CCD storage matrix, and the output of the storage matrix used as an input to a television or other viewer, either near or remote. Another advantage of this invention is that no single scanned LED column with its attendant problems is used.

DESCRIPTION OF PREFERRED EMBODIMENT

Figure 1:
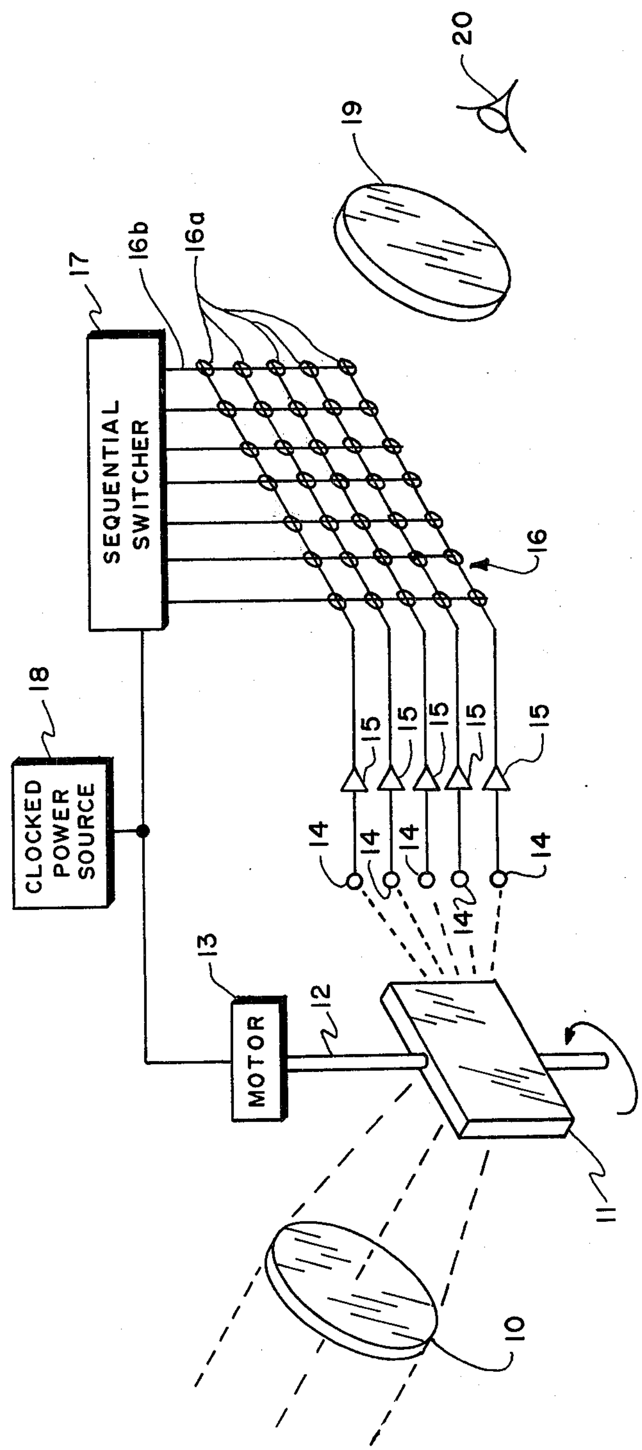
FIG. 1 is a schematic showing of a direct-view embodiment of the invention.

The invention may be best understood when this description is taken in conjunction with the drawings, in which FIG. 1 shows an embodiment of the invention with lens 10 directing radiation onto mirror 11. This mirror is attached to shaft 12 and is rotated by motor 13. The radiation reflected from 11 impinges onto a column of photodetectors 14. The outputs of the photodetectors are amplified in the usual manner by a column of amplifiers 15. All of elements 10–15 thus far described or their equivalents are known in the art, as shown in Chapters 7 and 8 of the book *Thermal Imaging Systems* by J. M. Lloyd. This book bears a copyright date of 1975, was published by Plenum Press, and has Library of Congress Catalog Card No.: 75-9635.

Connected to the column of amplifiers 15 is matrix 16 consisting of addressable plural rows of columns of light emitters 16*a*. As can be seen on the drawings, each column of emitters has members corresponding to each photodetector 14 and connected to respective amplifiers 15. It should be understood that emitters 16*a* may be connected directly to photodetectors 14 if these photodetectors provide sufficiently strong signals.

The various columns of matrix 16 may be enabled or energized by lines 16*b* connected to sequential switcher 17. This switcher is stepped by clocked power source 18, and 18 also drives motor 13. As switcher 17 operates, successive ones of lines 16*a* are enabled or energized. A switcher capable of operation in this mode is described in the article, "Special Counter Circuits for Experimenters" on pages 98–101 of the September 1980 issue of *Popular Electronics*. As each column of emitters is enabled or energized, the individual emitters in that column will emit light in accordance with the radiation on respective photodetectors 14. This light from emitters 16*a* is seen through lens 19 by eye 20 of an observer. The observer will thus see an image composed of a matrix of light-emitters. Obviously, if the drive rate of source 18 is sufficiently high, persistance of vision will eliminate flicker from the scanning of the image.

OPERATION OF FIG. 1 INVENTION

The operation of the invention is included in the description above, but will be repeated here. A scene to be observed is scanned by mirror 11 and reflected onto a column of detectors 14. The outputs of the detectors are fed to display matrix 16 having a plurality of rows and columns of light emitters 19*a*. As the scene is scanned, successive columns of emitters are enabled or energized and the emitters of each column corresponding to respective detectors emit light in accordance with the amount of radiation on their respective detectors. An observer is thus presented with a column-sequential picture of the scene.

Figure 2:
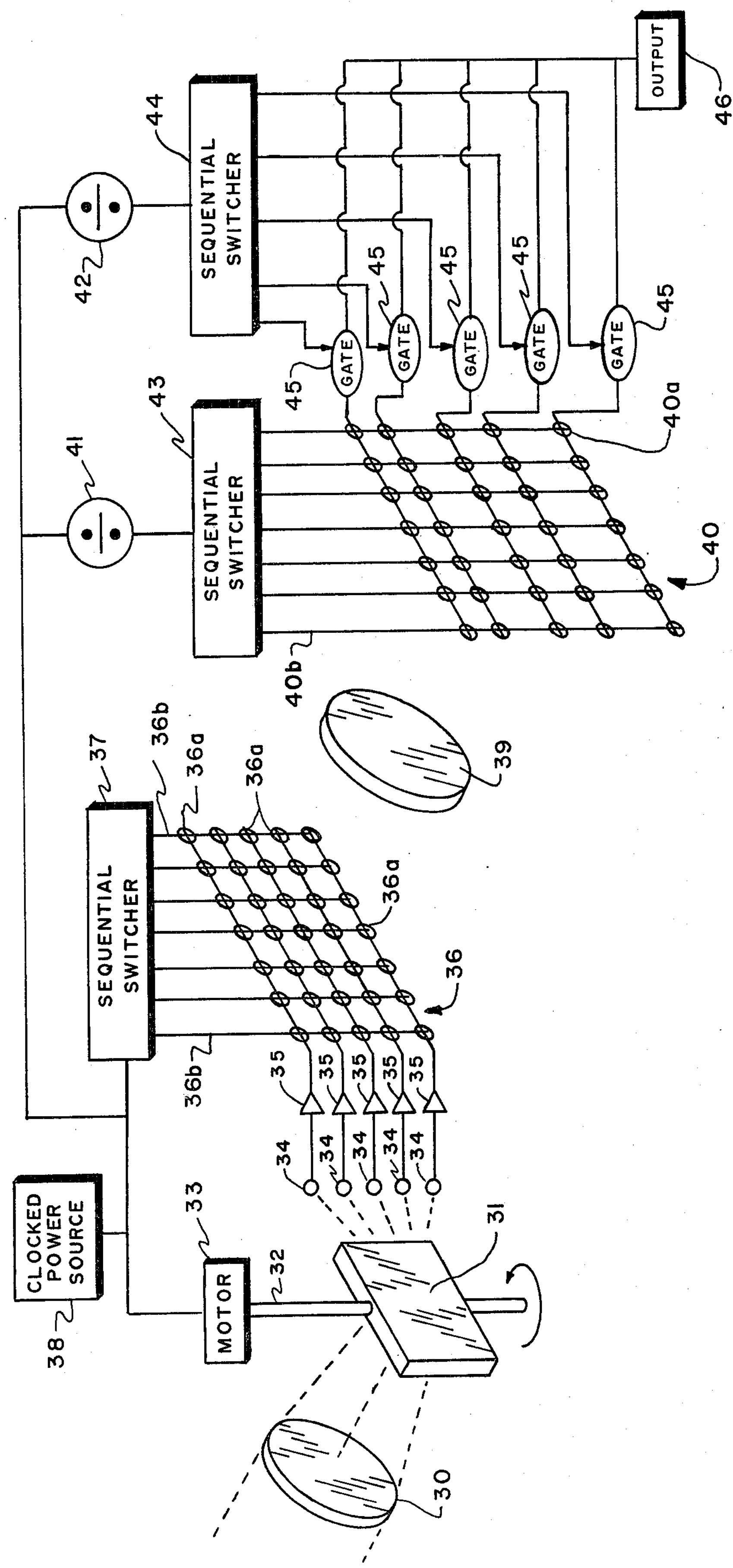
FIG. 2 is a schematic showing of a remote-view embodiment of the invention.

FIG. 2 shares many common elements with FIG. 1. As a matter of fact, elements 30–39 of FIG. 2 directly correspond to elements 10–20 of FIG. 1, and operate in the same manner. FIG. 2 is different, however, since lens 39, instead of acting as an eyepiece for an observer, focusses the light from emitters 36*a* of matrix 36 onto corresponding photodetectors 40*a* of strorage matrix 40. This matrix may perform several functions; if matrix 36 has a low level output, 40 may provide amplification; if matrix 36 has a low contrast output, 40 may enhance contrast; matrix 40 provides signal usable as a video signal for a television presentation and may be any one of various known detector arrays. For example, each element 40 may be a photoresistor, phototransistor or photodiode; the light falling on such an element will cause a corresponding variation in voltage output, resistance, or some other state of the element. The state of the elements may be sampled sequentially element-by-element in a row, and row-by-row by various known means. The drawing shows one such means. Connected to clocked power source 38 are dividers and connected to sequential switchers 43 and 44. The output of 43 sequentially provide input or enable signals to the various columns of matrix 40. At the same time, 44 provides an input or enable signal to one of gates 45. The overall effect is a video type sequential scanning of each row of elements of 40. The outputs of the various elements thus are passed by gates 45 to output terminal 46. This terminal may act as a feed for a television display or the like.

Instead of elements 41–45 as described, one may use a CCD read-out means as known for matrix read-outs. Moreover, motors 13 and 33 and their associated mirrors may be replaced by various other known means such as a rotating faceted mirror. Instead of a lens, the optical element 42 may be a fiber optic plate or fiber optic magnifier. A typical example of a CCD readout is that as shown in U.S. Pat. No. 3,902,066 of Aug. 26, 1975. Clocked power sources 18 and 38 are merely pulse sources of sufficient power to supply various elements 17, 37, 41 and 42. Various type of displays which may be used for matrices 16 and 36 are shown in the "*Proceedings of the SID,*" Vol, 17, No. 1, First Quarter, 1976.

I claim:

1. An infrared viewing system including:

a column of infrared detectors each having an output;

means for scanning said column with respect to an infrared image;

a display matrix having a plurality of columns of light emitters, each column having emitters corresponding to respective detectors; and means for sequentially connecting the outputs of the columns of detectors to successive columns of the matrix whereby respective detector outputs of the column of detectors are connected to corresponding light emitters in the columns of light emitters as the scanning of the infrared image occurs.

2. The system as recited in claim 1 further including a conversion matrix having visible light detectors corresponding to the light emitters of said display matrix, and means for sequentially determing the states of the visible light detectors and providing an output signal in accordance therewith.

* * * * *